(12) United States Patent
Tang

(10) Patent No.: US 7,468,847 B2
(45) Date of Patent: Dec. 23, 2008

(54) OPTICAL LENS SYSTEM FOR TAKING IMAGE

(75) Inventor: Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/755,738

(22) Filed: May 31, 2007

(65) Prior Publication Data

US 2008/0151389 A1 Jun. 26, 2008

(30) Foreign Application Priority Data

Dec. 25, 2006 (TW) .............................. 95148721 A

(51) Int. Cl.
*G02B 9/14* (2006.01)
(52) U.S. Cl. ...................... 359/785; 359/784
(58) Field of Classification Search ................. 359/690, 359/716, 784, 785, 779, 774, 773
See application file for complete search history.

(56) References Cited

U.S. PATENT DOCUMENTS 5,071,235 A * 12/1991 Mori et al. .................. 359/692
7,184,225 B1 * 2/2007 Noda .......................... 359/784
7,295,384 B1 * 11/2007 Sato et al. ................... 359/716
7,301,712 B2 * 11/2007 Kamo ......................... 359/785

* cited by examiner

*Primary Examiner*—Timothy J Thompson
(74) *Attorney, Agent, or Firm*—Banger Shia

(57) ABSTRACT

An optical lens system for taking image comprises three lens elements with refractive power, from the object side to the image side: a first positive lens element having a convex surface on the object side and a concave surface on the image side, and at least one of the object side and image-side surfaces being aspheric; a negative plastic second lens element having a concave surface on the object side and a convex surface on the image side, and the object-side and image-side surfaces thereof being aspheric; a positive plastic third lens element having a convex surface on the object side and a concave surface on the image side, the object-side and image-side surfaces thereof being aspheric; and an aperture stop located in front of the first lens element for controlling brightness of the optical lens system. A focal length of the second lens element is f2, a focal length of the optical lens system is f, and they satisfy the relation: $0.1<|f/f2|<0.74$.

21 Claims, 6 Drawing Sheets

OPTICAL LENS SYSTEM FOR TAKING IMAGE

BACKGROUND OF THE INVENTION

1. Field of the Invention

The present invention relates to an optical lens system, and more particularly to a miniaturized optical lens system for taking image used in a camera mobile phone.

2. Description of the Prior Art

In recent years, with the popularity of camera mobile phone, the optical lens system for taking image has been becoming thinner and thinner, and the sensor of a general digital camera is none other than CCD (Charge Coupled Device) or CMOS (Complementary Metal Oxide Semiconductor). Due to advances in semiconductor manufacturing, the pixel size of sensors has been being reduced continuously, and miniaturized optical lens systems for taking image have increasingly higher resolution. Therefore, the demand for the image quality is increasing.

A conventional mobile phone's lens assembly usually consists of three lens elements: from the object side to the image side: a first lens element with positive refractive power, a second lens element with negative refractive power and a third lens element with positive refractive power, thus forming the so-called type of Triplet. To balance the light refractive power of the optical lens system, the optical lens system usually takes the form of "middle aperture stop". However, the arrangement of middle aperture stop has the following disadvantages:

Firstly, a "middle aperture stop" type optical lens system requires a relatively long total optical length, which results in a relatively large mechanical structure, therefore, the middle aperture stop is inapplicable to a more miniaturized optical lens system for taking image.

Secondly, the exit pupil of the "middle aperture stop" type optical lens system is located closer to the image plane, making it more difficult for the optical designer to control light's incident angle on the sensor. In addition, "middle aperture stop" type optical lens systems inherently have pupil aberration which will increase the probability of the occurrence of vignetting.

The present invention mitigates and/or eliminates the afore-described disadvantages.

SUMMARY OF THE INVENTION

The primary objective of the present invention is to improve the image quality and effectively reduce the volume of the optical lens system, the present invention provides a whole new three-lens type optical lens system.

An optical lens system for taking image in accordance with the present invention comprises three lens elements with refractive power, from the object side to the image side:

a first lens element with positive refractive power having a convex surface on the object side and a concave surface on the image side, and at least one of the object-side surface and the image-side surface of the first lens element being aspheric;

a plastic second lens element with negative refractive power having a concave surface on the object side and a convex surface on the image side, both the object-side surface and the image-side surface of the second lens element being aspheric; and a plastic third lens element with positive refractive power having a convex surface on the object side and a concave surface on the image side, both the object-side surface and the image-side surface of the third lens element being aspheric;

wherein an aperture stop of the optical lens system is located in front of the first lens element for controlling brightness of the optical lens system.

In the optical lens system for taking image, the refractive power of the optical lens system for taking image of the present invention is mainly provided by the first lens element with positive refractive power, the second lens element with negative refractive power is generally used to correct the chromatic aberration, and the third lens element serves to balance and correct the various aberrations caused by the system.

In the optical lens system for taking image, the object-side surface and the image-side surface of the first lens element with positive refractive power are convex and concave, respectively. The object-side surface and the image-side surface of the second lens element with negative refractive power are concave and convex, respectively. And the object-side surface and the image-side surface of the third lens element with positive refractive power are convex and concave, respectively. By such arrangements, the image quality can be improved effectively.

The first lens element provides a strong positive refractive power, and the aperture stop is located in front of the first lens element, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of shading. And at least one inflection point is formed on the third lens element to contribute to a better correction of the incident angle of the off axis light with respect to the sensor.

With the trend of miniaturization of the optical lens system and the requirement of increasing the field of view, the focal length of the optical lens system is becoming very short. Therefore, the radius of curvature and the size of the lens elements must be very small, and it is impossible to make such glass lens elements by the use of the conventional grind method. Plastic material is introduced to make lens elements by injection molding, using a relatively low cost to produce high precision lens elements. The surface of lens element is aspheric, allowing more design parameters (than spherical surfaces), so as to better reduce the aberration and the number of the lens elements, so that the length of the optical lens system can be reduced effectively.

In the present optical lens system for taking image, the focal length of the first lens element is f1, the focal length of the optical lens system is f, and they satisfy the relation:

$$f/f1 > 0.9$$

If the value of f/f1 is smaller than the above low limit, the refractive power of the optical lens system for taking image will be weak, the length of the optical lens system will be too long, and it will be difficult to suppress the incident angle of the light with respect to the sensor. Further, it will be better if f/f1 satisfies the relation:

$$1.1 < f/f1 < 2.0$$

In the present optical lens system for taking image, the focal length of the second lens element is f2, the focal length of the optical lens system is f, and they satisfy the relation:

$$|f/f2| < 0.74$$

If the value of |f/f2| is greater than the above upper limit, the total optical length of the optical lens system for taking image will be too long, and this will be counter to the objective of miniaturization of the optical lens system for taking image. Further, it will be better if |f/f2| satisfies the relation:

$$|f/f2|<0.6$$

In the present optical lens system for taking image, the focal length of the second lens element is f2, the focal length of the optical lens system is f, and they satisfy the relation:

$$|f/f2|>0.1$$

If the value of |f/f2| is smaller than the above low limit, it will be difficult to correct the chromatic aberration caused by the optical lens system. Further, it will be better if |f/f2| satisfies the relation:

$$|f/f2|>0.3$$

In the present optical lens system for taking image, the focal length of the third lens element is f3, the focal length of the optical lens system is f, and they satisfy the relation:

$$f/f3>0.35$$

The third lens element serves as a correcting lens element to balance and correct the various aberrations caused by the optical lens system. If the value of f/f3 is smaller than the above low limit, the back focal length of the optical lens system will be too long.

In the present optical lens system for taking image, an Abbe number of the second lens element is V2, and it satisfies the relation:

$$V2<40$$

The above relation can effectively correct the chromatic aberration caused by the system, and improve the resolution of the optical lens system for taking image. And it will be better if the Abbe number V2 of the second lens element satisfies the relation:

$$V2<28$$

Further, it will be much better if the Abbe number V2 of the second lens element satisfies the relation:

$$V2<25$$

In the present optical lens system for taking image, the Abbe number of the first lens element is V1, the Abbe number of the third lens element is V3, and they satisfy the relations:

$$V1>50$$

$$V3>50$$

The above relations can effectively correct the chromatic aberration caused by the system.

In the present optical lens system for taking image, the refractive index of the first lens element is N1, the refractive index of the second lens element is N2, and they satisfy the relations:

$$N1<1.6$$

$$N2<1.7$$

If the refractive index of the first lens element and the second lens element are higher than the high limit as stated above, it will be difficult to find an appropriate plastic optical material to match the optical lens system.

In the present optical lens system for taking image, the radius of curvature of the object-side surface of the first lens element is R1, the radius of curvature of the image-side surface of the first lens element is R2, and they satisfy the relation:

$$0.05<R1/R2<0.5$$

If the value of R1/R2 is lower than the low limit as stated above, it will be difficult to correct the astigmatism caused by the optical lens system for taking image. On the other hand, if the value of R1/R2 is higher than the above high limit, it will be difficult to correct the spherical aberration caused by the optical lens system. And it will better if the value of R1/R2 satisfies the relation:

$$0.25<R1/R2<0.45$$

In the present optical lens system for taking image, the radius of curvature of the object-side surface of the second lens element is R3, the radius of curvature of the image-side surface of the second lens element is R4, and they satisfy the relation:

$$0.3<R3/R4<0.8$$

If the value of R3/R4 is lower than the low limit as stated above, R3 will be relatively small, and the length of the optical lens system for taking image will be too long. On the other hand, if the value of R3/R4 is higher than the above high limit, R3 will be relatively large, and it will be difficult to correct the chromatic aberration caused by the optical lens system. And it will be better if the value of R3/R4 satisfies the relation:

$$0.5<R3/R4<0.65$$

In the present optical lens system for taking image, the radius of curvature of the object-side surface of the third lens element is R5, the radius of curvature of the image-side surface of the third lens element is R6, and they satisfy the relation:

$$0.55<R5/R6<0.75$$

The above relation can effectively correct the high order aberrations of the system.

In the present optical lens system for taking image, the tangential angle at the position of the effective optical diameter of an image-side surface of the third lens element is ANG32, and it satisfies the relation:

$$ANG32<-32 \text{ deg.}$$

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and planes, Plane Tan and Plane Norm, respectively. This tangential angle is less than 90 degree in absolute value. The sign of the tangential angle is taken to be negative if N is closer than T to the object side of the optical lens system, and positive otherwise.

The above relation can effectively reduce the incident angle of the light with respect to the sensor while improving the correction of the off axis aberration.

In the present optical lens system for taking image, the radius of curvature of the image-side surface of the first lens element is R2, and it satisfies the relation:

$$R2<6 \text{ mm}$$

The above relation can effectively correct the astigmatism caused by the optical lens system for taking image. And it will be better if R2 satisfies the relation:

$$R2/f<2.0$$

In the present optical lens system for taking image, the radius of curvature of the object-side surface of the second lens element is R3, and it satisfies the relation:

$|R3/f|<1.2$ mm

The above relation can effectively correct the chromatic aberration caused by the system. And it will be better if R3 satisfies the relation:

$|R3/f|<0.45$

In the present optical lens system for taking image, the center thickness of the second lens element is CT2, and it satisfies the relation:

0.25 mm<CT2<0.4 mm

If the value of CT2 is lower than the high limit as stated above, the total optical length of the optical lens system can be reduced effectively, and the image quality can be improved effectively. If the value of CT2 is higher than the low limit as stated above, plastic lens elements made by injection molding will be more homogeneous in material properties.

In the present optical lens system for taking image, the distance between the second lens element and the third lens element is T23, and it satisfies the relation:

T23<0.1 mm

The above relation can effectively reduce the total optical length of the optical lens system.

In the present optical lens system for taking image, an object to be photographed is imaged on an electronic sensor, a total optical length of the optical lens system is TL, an image height of the optical lens system is ImgH, and they satisfy the relation:

TL/ImgH<2.12

The above relation contributes to the miniaturization of the optical lens system for taking image.

DETAILED DESCRIPTION OF THE PREFERRED EMBODIMENTS

Figure 1:
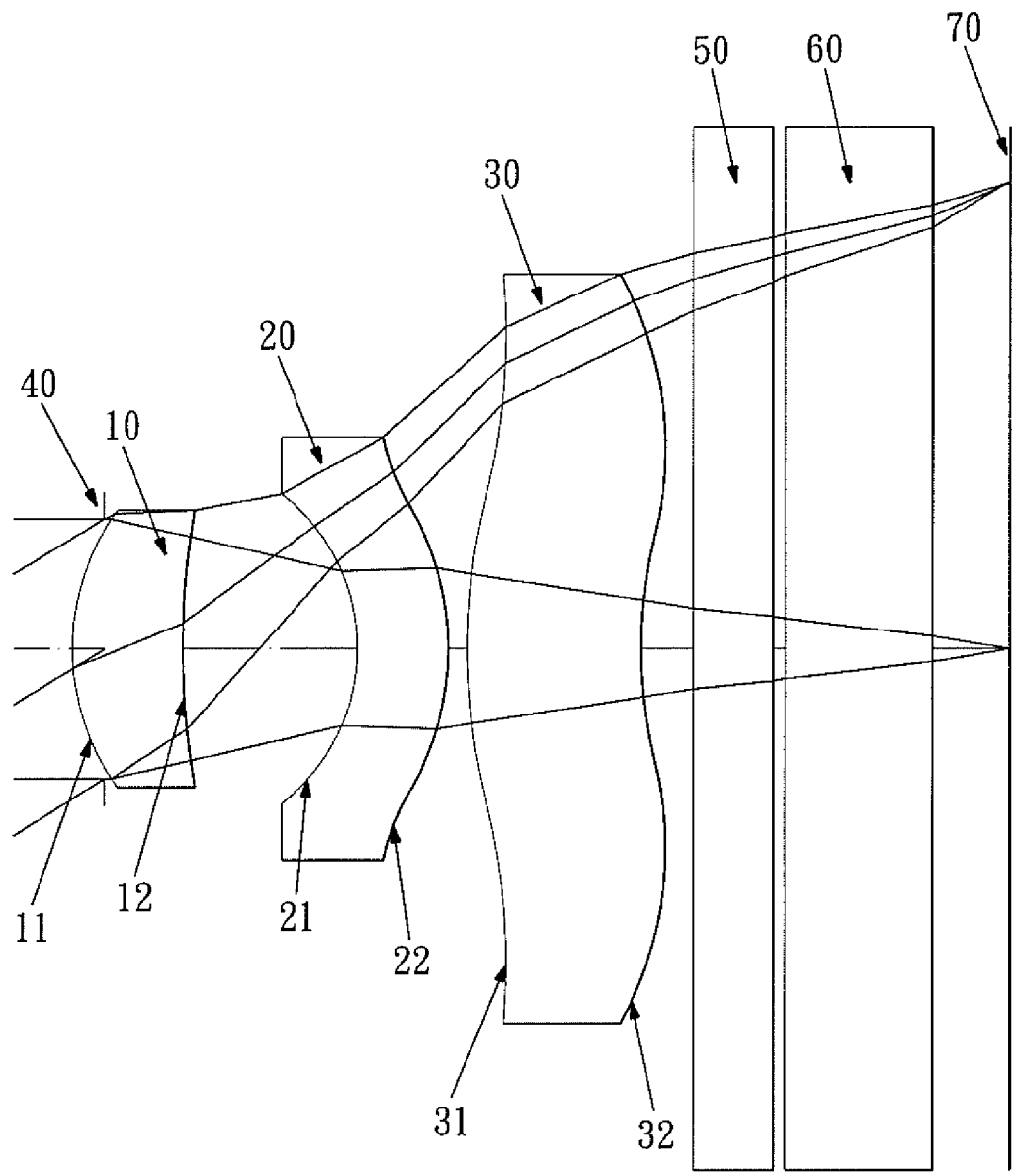
FIG. 1 shows an optical lens system for taking image in accordance with a first embodiment of the present invention.
Figure 2:
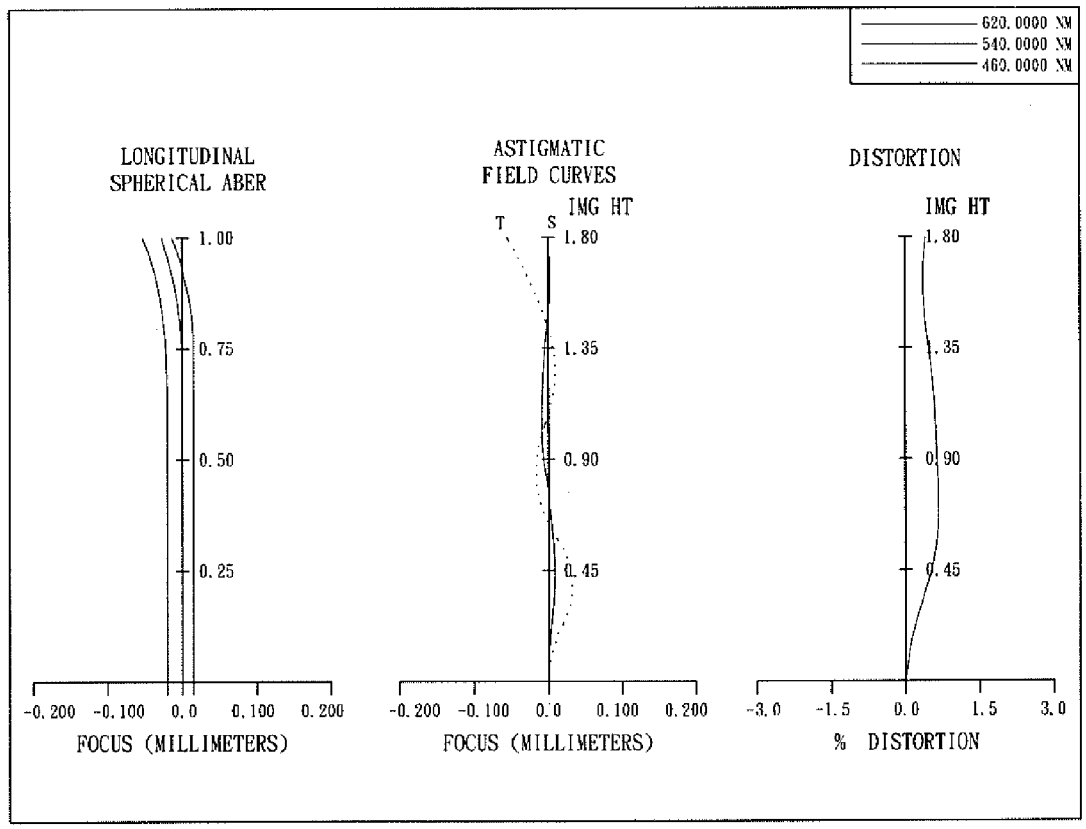
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. The first embodiment of the present invention is an optical lens system for taking image comprising three lens elements with refractive power, and the optical lens system for taking image comprises: from the object side to the image side:

A plastic first lens element 10 with positive refractive power has a convex surface on the object side 11 and a concave surface on the image side 12, and the object-side surface 11 and the image-side surface 12 of the first lens element 10 are aspheric.

A plastic second lens element 20 with negative refractive power has a concave surface on the object side 21 and a convex surface on the image side 22, and the object-side surface 21 and the image-side surface 22 of the second lens element 20 are aspheric.

A plastic third lens element 30 with positive refractive power has a convex surface on the object side 31 and a concave surface on the image side 32, the object-side surface 31 and the image-side surface 32 of the third lens element 30 are aspheric, and an inflection point is formed on the object-side surface 31 and the image-side surface 32.

An aperture stop 40 is located in front of the first lens element 10 for controlling brightness of the optical lens system.

An IR cut filter 50 is located behind the third lens element 30 and has no influence on the focal length of the optical lens system.

A sensor cover glass 60 is located behind the IR cut filter 50 and has no influence on the focal length of the optical lens system.

An image plane 70 is located behind the sensor cover glass 60.

The equation of the curve of the aspheric surfaces is expressed as follows:

$$X(Y)=(Y^2/R)/(1+\mathrm{sqrt}\,(1-(1+k)*(Y/R)^2))+A_4*Y^4+A_6*Y^6+\ldots+A_{12}*Y^{12}$$

wherein:

X: the length of a line drawn from a point on the aspheric lens surface at a distance Y from the optical axis to the tangential plane of the aspheric surface vertex;

Y: the distance from the point on the curve of the aspheric surface to the optical axis;

K: represents the conic coefficient;

A4, A6 . . . , A12: the aspheric surface coefficients of the fourth, sixth, . . . , twelfth order.

In the first embodiment of the present optical lens system for taking image, the focal length of the first lens element is f1, the focal length of the second lens element is f2, the focal length of the third lens element is f3, the focal length of the optical lens system for taking image is f, and they satisfy the relations:

$f/f1=1.17$ $|f/f2|=0.67$ $f/f3=0.49$

In the first embodiment of the present optical lens system for taking image, the Abbe number of the first lens element is V1, the Abbe number of the second lens element is V2, and the Abbe number of the third lens element is V3, and they satisfy the relations:

V1=60.3

V2=23.4

V3=55.8

In the first embodiment of the present optical lens system for taking image, the refractive index of the first lens element is N1, the refractive index of the second lens element is N2, and they satisfy the relations:

$N1 = 1.543$ $N2 = 1.632$

In the first embodiment of the present optical lens system for taking image, the radius of curvature of the object-side surface of the first lens element is R1, and the radius of curvature of the image-side surface of the first lens element is R2. The radius of curvature of the object-side surface of the second lens element is R3, and the radius of curvature of the image-side surface of the second lens element is R4. The radius of curvature of the object-side surface of the third lens element is R5, and the radius of curvature of the image-side surface of the third lens element is R6. And they satisfy the relations:

$R1/R2 = 0.31$ $R3/R4 = 0.62$ $R5/R6 = 0.71$

In the first embodiment of the present optical lens system for taking image, the tangential angle at the position of the effective optical diameter of a image-side surface of the third lens element is ANG32, and ANG32=−40.3 deg.

The tangential angle at a point on the surface of a lens is defined as the angle between the tangential plane, Plane Tan, passing through that point and a plane, Plane Norm, normal to the optical axis and passing through that point. Let T and N be the points of intersection between the optical axis and planes, Plane Tan and Plane Norm, respectively. This tangential angle is less than 90 degree in absolute value. The sign of the tangential angle is taken to be negative if N is closer than T to the object side of the optical lens system, and positive otherwise.

In the first embodiment of the present optical lens system for taking image, the radius of curvature of the image-side surface of the first lens element is R2, the radius of curvature of the object-side surface of the second lens element is R3, the focal length of the optical lens system for taking image is f, and they satisfy the relations:

$R2 = 3.15940$ mm $|R3| = 0.70263$ mm $R2/f = 1.11$ $|R3/f| = 0.25$

In the first embodiment of the present optical lens system for taking image, the center thickness of the second lens element is CT2, the distance between the second lens element and the third lens element is T23, and they satisfy the relations:

$CT2 = 0.350$ mm $T23 = 0.070$ mm

In the first embodiment of the present optical lens system for taking image, the total optical length of the optical lens system is TL, the image height of the optical lens system is ImgH, and they satisfy the relation:

$TL/ImgH = 1.97$

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 2.84 mm, Fno = 2.85, HFOV (half of field of view) = 32.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.122 | | | | |
| 2 | Lens 1 | 0.97958(ASP) | 0.424 | Plastic | 1.543 | 60.3 | 2.43 |
| 3 | | 3.15940(ASP) | 0.650 | | | | |
| 4 | Lens 2 | −0.70263(ASP) | 0.350 | Plastic | 1.632 | 23.4 | −4.20 |
| 5 | | −1.13607(ASP) | 0.070 | | | | |
| 6 | Lens 3 | 1.29453(ASP) | 0.659 | Plastic | 1.530 | 55.8 | 5.84 |
| 7 | | 1.82496(ASP) | 0.200 | | | | |
| 8 | IR-filter | Plano | 0.300 | Glass | 1.517 | 64.2 | — |
| 9 | | Plano | 0.050 | | | | |
| 10 | Cover Glass | Plano | 0.550 | Glass | 1.517 | 64.2 | — |
| 11 | | Plano | 0.300 | | | | |
| 12 | Image | Plano | | | | | |

TABLE 2

Aspheric Coefficient

| | Surface # | | | | | |
|---|---|---|---|---|---|---|
| | 2 | 3 | 4 | 5 | 6 | 7 |
| K = | −7.18809E−02 | 1.72229E+01 | −3.62374E+00 | −6.18592E+00 | −1.23991E+01 | −6.85810E+00 |
| A4 = | 4.19962E−02 | −4.18871E−02 | −7.14817E−01 | −6.32933E−01 | −1.88727E−01 | −1.65909E−01 |
| A6 = | −1.35818E−02 | 5.97871E−02 | 1.21337E+00 | 1.01291E+00 | 2.18878E−01 | 7.22132E−02 |
| A8 = | 1.69238E−01 | −6.88977E−01 | −1.22850E+01 | −3.50691E−01 | −1.37848E−01 | −2.87182E−02 |
| A10 = | — | — | 5.27579E+01 | — | 4.36792E−02 | 6.87094E−03 |
| A12 = | — | — | −8.40233E+01 | — | −5.70735E−03 | −1.19538E−03 |

Figure 3:
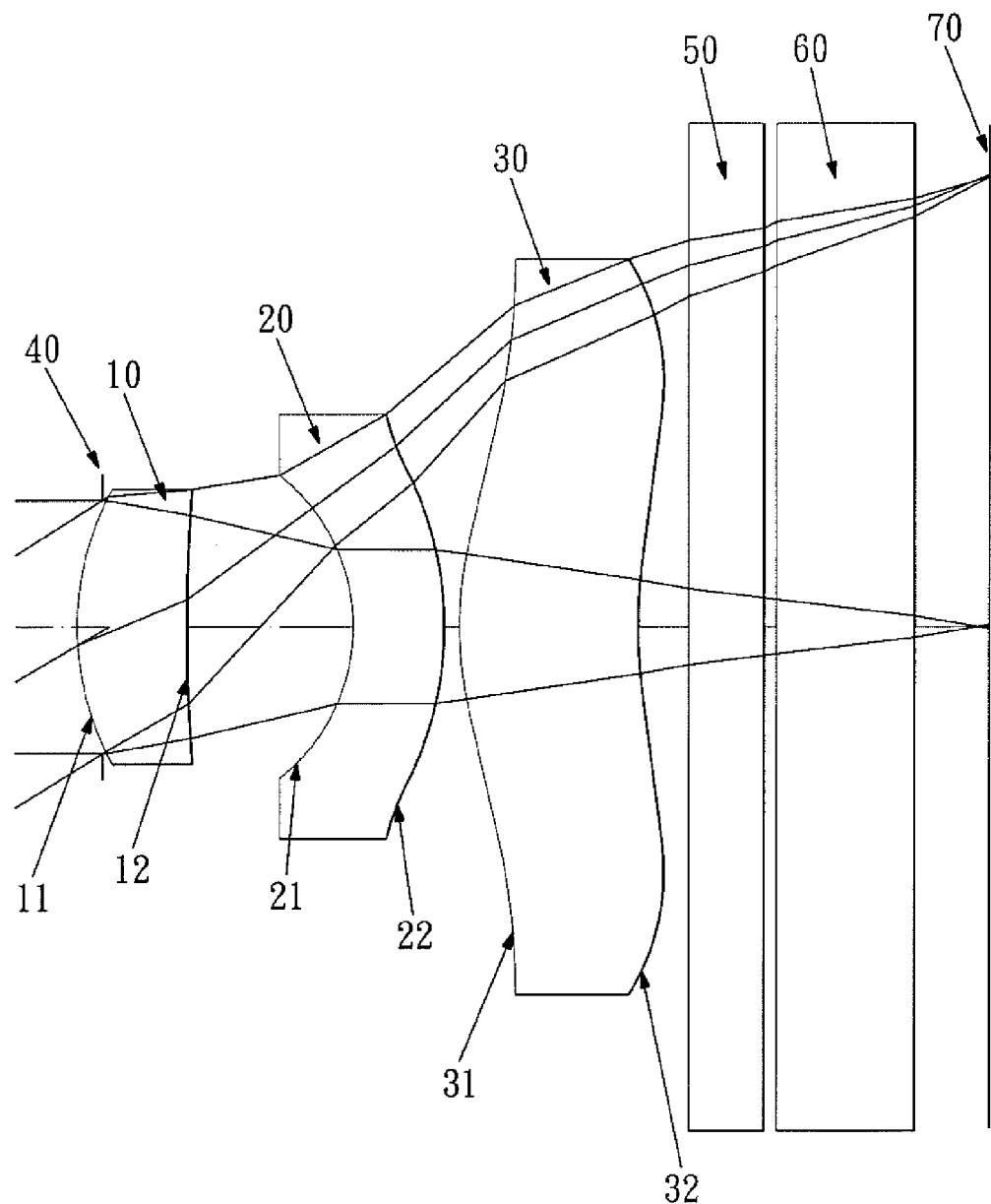
FIG. 3 shows an optical lens system for taking image in accordance with a second embodiment of the present invention.
Figure 4:
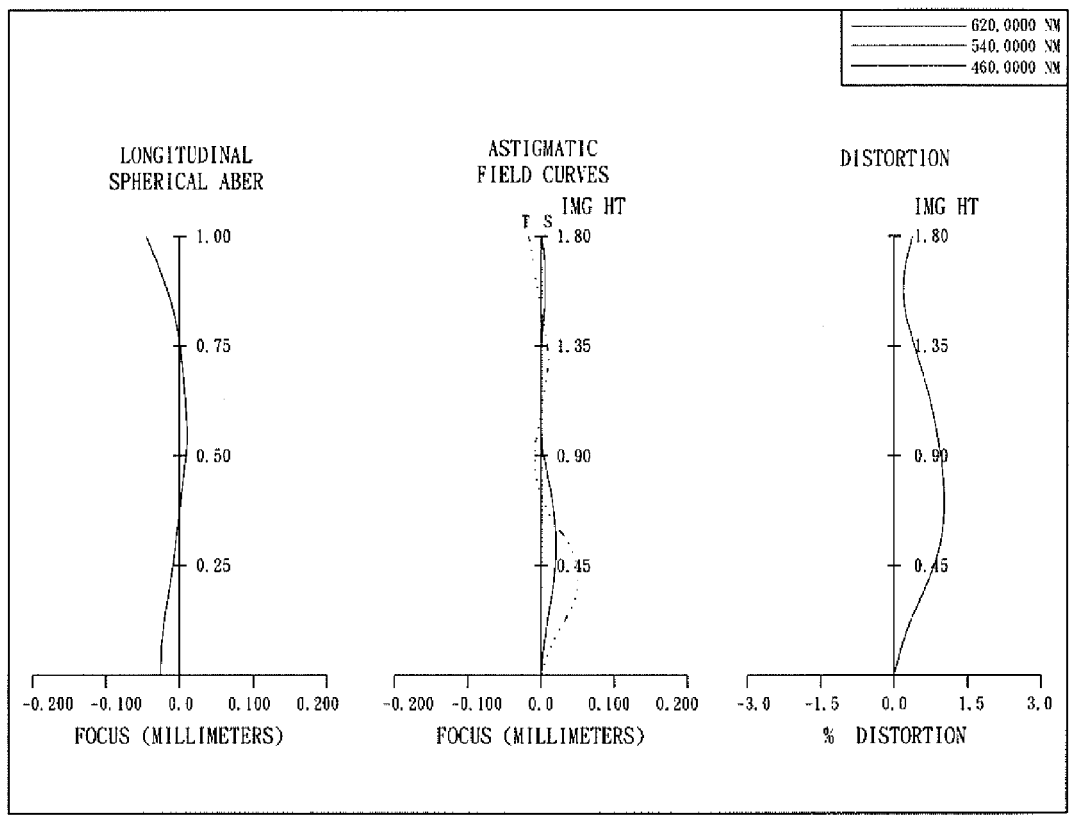
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention is an optical lens system for taking image comprising three lens elements with refractive power, and the optical lens system for taking image comprises: from the object side to the image side:

A plastic first lens element 10 with positive refractive power has a convex surface on the object side 11 and a concave surface on the image side 12, and the object-side surface 11 and the image-side surface 12 of the first lens element 10 are aspheric.

A plastic second lens element 20 with negative refractive power has a concave surface on the object side 21 and a convex surface on the image side 22, and the object-side surface 21 and the image-side surface 22 of the second lens element 20 are aspheric.

A plastic third lens element 30 with positive refractive power has a convex surface on the object side 31 and a concave surface on the image side 32, the object-side surface 31 and the image-side surface 32 of the third lens element 30 are aspheric, and an inflection point is formed on the object-side surface 31 and the image-side surface 32.

An aperture stop 40 is located in front of the first lens element 10 for controlling brightness of the optical lens system.

An IR cut filter 50 is located behind the third lens element 30 and has no influence on the focal length of the optical lens system.

A sensor cover glass 60 is located behind the IR cut filter 50 and has no influence on the focal length of the optical lens system.

An image plane 70 is located behind the sensor cover glass 60.

The equation of the curve of the aspheric surfaces of the second embodiment is the same as that of the first embodiment.

In the second embodiment of the present optical lens system for taking image, the focal length of the first lens element is f1, the focal length of the second lens element is f2, the focal length of the third lens element is f3, the focal length of the optical lens system for taking image is f, and they satisfy the relations:

$f/f1=1.16$ $|f/f2|=0.73$ $f/f3=0.52$

In the second embodiment of the present optical lens system for taking image, the Abbe number of the first lens element is V1, the Abbe number of the second lens element is V2, and the Abbe number of the third lens element is V3, and they satisfy the relations:

$V1=60.3$ $V2=30.2$ $V3=55.8$

In the second embodiment of the present optical lens system for taking image, the refractive index of the first lens element is N1, the refractive index of the second lens element is N2, and they satisfy the relations:

$N1=1.543$ $N2=1.583$

In the second embodiment of the present optical lens system for taking image, the radius of curvature of the object-side surface of the first lens element is R1, and the radius of curvature of the image-side surface of the first lens element is R2. The radius of curvature of the object-side surface of the second lens element is R3, and the radius of curvature of the image-side surface of the second lens element is R4. The radius of curvature of the object-side surface of the third lens element is R5, and the radius of curvature of the image-side surface of the third lens element is R6. And they satisfy the relations:

$R1/R2=0.28$ $R3/R4=0.58$ $R5/R6=0.66$

In the second embodiment of the present optical lens system for taking image, the tangential angle at the position of the effective optical diameter of a image-side surface of the third lens element is ANG32, and ANG32=−35.3 deg.

The definition of the tangential angle of the second embodiment is the same as that of the first embodiment.

In the second embodiment of the present optical lens system for taking image, the radius of curvature of the image-side surface of the first lens element is R2, the radius of curvature of the object-side surface of the second lens element is R3, the focal length of the optical lens system for taking image is f, and they satisfy the relations:

$R2=3.73700$ mm $|R3|=0.74301$ mm $R2/f=1.29$ $|R3/f|=0.26$

In the second embodiment of the present optical lens system for taking image, the center thickness of the second lens element is CT2, the distance between the second lens element and the third lens element is T23, and they satisfy the relations:

CT2=0.350 mm

T23=0.070 mm

In the second embodiment of the present optical lens system for taking image, the total optical length of the optical lens system is TL, the image height of the optical lens system is ImgH, and they satisfy the relation:

TL/ImgH=2.00

The detailed optical data of the second embodiment is shown in table 3, and the aspheric surface data is shown in table 4, wherein the units of the radius of curvature, the thickness and the focal length are expressed in mm, and HFOV is half of the maximal field of view.

concave surface on the image side 12, and the object-side surface 11 and the image-side surface 12 of the first lens element 10 are aspheric.

A plastic second lens element 20 with negative refractive power has a concave surface on the object side 21 and a convex surface on the image side 22, and the object-side surface 21 and the image-side surface 22 of the second lens element 20 are aspheric.

A plastic third lens element 30 with positive refractive power has a convex surface on the object side 31 and a concave surface on the image side 32, the object-side surface 31 and the image-side surface 32 of the third lens element 30 are aspheric, and an inflection point is formed on the object-side surface 31 and the image-side surface 32.

An aperture stop 40 is located in front of the first lens element 10 for controlling brightness of the optical lens system.

TABLE 3

(Embodiment 2)
f(focal length) = 2.90 mm, Fno = 2.85, HFOV (half of field of view) = 31.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.114 | | | | |
| 2 | Lens 1 | 1.02950(ASP) | 0.439 | Plastic | 1.543 | 60.3 | 2.46 |
| 3 | | 3.73700(ASP) | 0.656 | | | | |
| 4 | Lens 2 | −0.74301(ASP) | 0.350 | Plastic | 1.583 | 30.2 | −3.93 |
| 5 | | −1.28610(ASP) | 0.070 | | | | |
| 6 | Lens 3 | 1.33371(ASP) | 0.697 | Plastic | 1.530 | 55.8 | 5.48 |
| 7 | | 2.01109(ASP) | 0.200 | | | | |
| 8 | IR-filter | Plano | 0.300 | Glass | 1.517 | 64.2 | — |
| 9 | | Plano | 0.050 | | | | |
| 10 | Cover Glass | Plano | 0.550 | Glass | 1.517 | 64.2 | — |
| 11 | | Plano | 0.300 | | | | |
| 12 | Image | Plano | | | | | |

TABLE 4

Aspheric Coefficient

| | Surface # | | | | | |
|---|---|---|---|---|---|---|
| | 2 | 3 | 4 | 5 | 6 | 7 |
| K = | −1.02313E+00 | 1.06626E+00 | −3.93957E+00 | −1.24925E+01 | −4.62233E+00 | −1.63957E+00 |
| A4 = | 1.03037E−01 | 1.85741E−02 | −4.61392E−01 | −3.31002E−01 | −1.99911E−01 | −1.76218E−01 |
| A6 = | 1.82119E−01 | −1.60420E−01 | 1.22759E+00 | 3.77555E−01 | 1.62348E−01 | 5.65303E−02 |
| A8 = | −3.00698E−01 | −4.83029E−01 | −1.42352E+01 | −3.76213E−02 | −7.09026E−02 | −1.97523E−02 |
| A10 = | — | — | 4.92453E+01 | — | 1.53014E−02 | 5.60456E−03 |
| A12 = | — | — | −6.86426E+01 | — | −1.38637E−03 | −1.06537E−03 |

Figure 5:
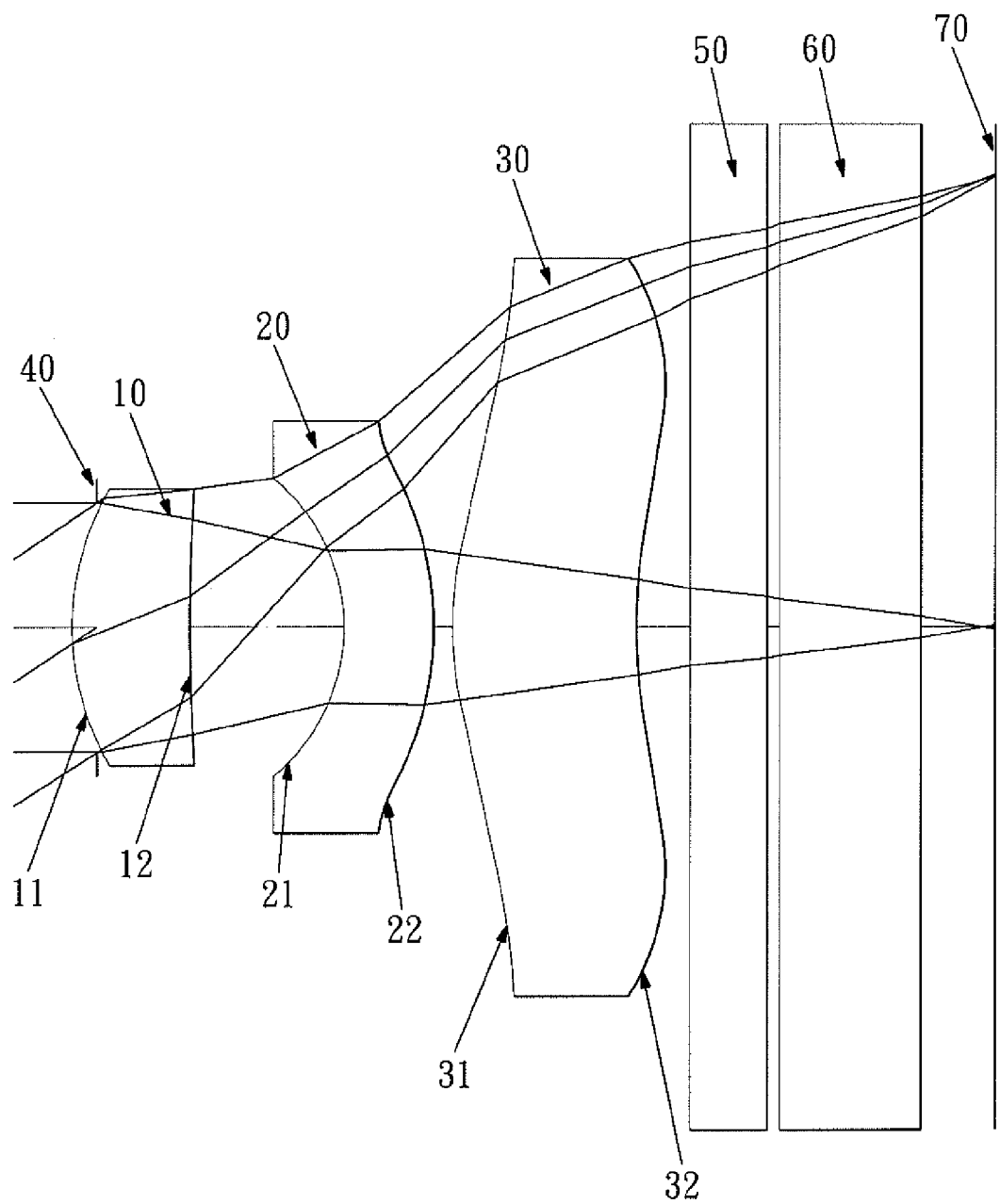
FIG. 5 shows an optical lens system for taking image in accordance with a third embodiment of the present invention.
Figure 6:
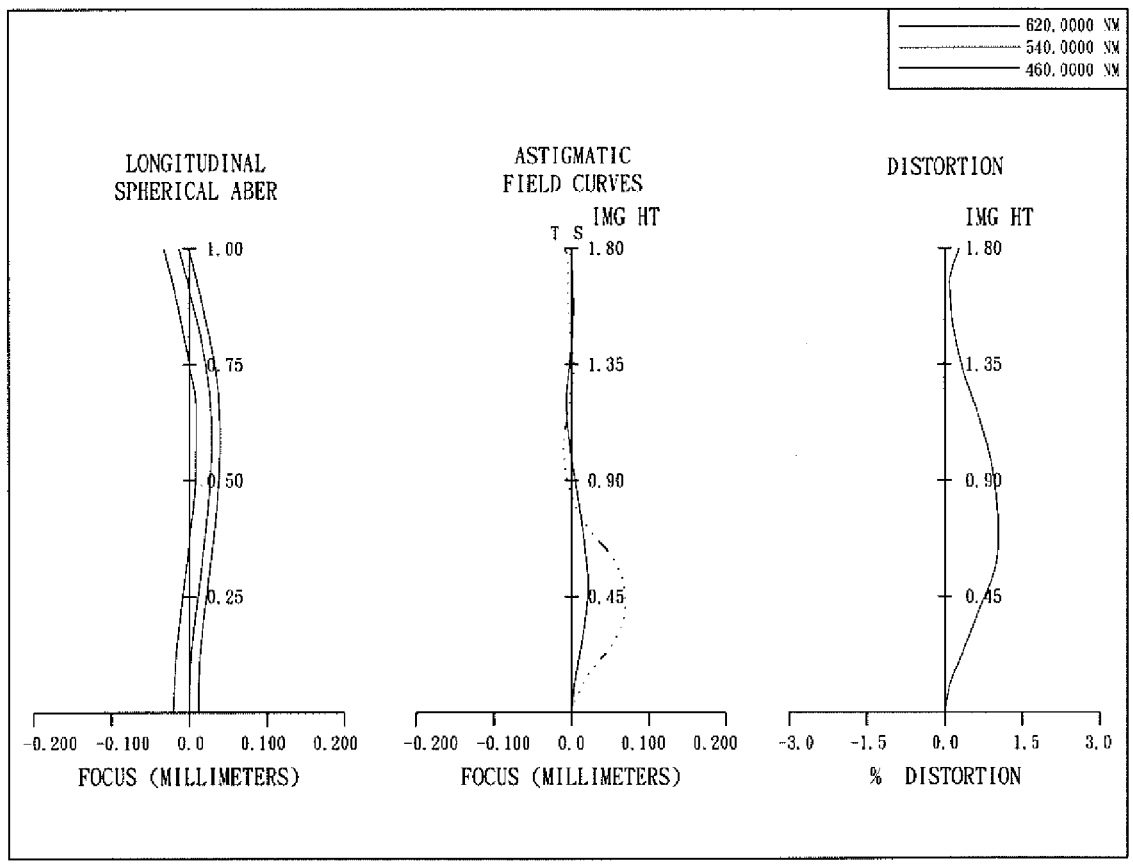
FIG. 6 shows the aberration curve of the third embodiment of the present invention.

Referring to FIG. 5, which shows an optical lens system for taking image in accordance with a third embodiment of the present invention, and FIG. 6 shows the aberration curve of the third embodiment of the present invention. The third embodiment of the present invention is an optical lens system for taking image comprising three lens elements with refractive power, and the optical lens system for taking image comprises: from the object side to the image side:

A plastic first lens element 10 with positive refractive power has a convex surface on the object side 11 and a An IR cut filter 50 is located behind the third lens element 30 and has no influence on the focal length of the optical lens system.

A sensor cover glass 60 is located behind the IR cut filter 50 and has no influence on the focal length of the optical lens system.

An image plane 70 is located behind the sensor cover glass 60.

The equation of the curve of the aspheric surfaces of the third embodiment is the same as that of the first embodiment.

In the third embodiment of the present optical lens system for taking image, the focal length of the first lens element is f1, the focal length of the second lens element is f2, the focal length of the third lens element is f3, the focal length of the optical lens system for taking image is f, and they satisfy the relations:

$f/f1=1.15$ $|f/f2|=0.59$ $f/3=0.43$

In the third embodiment of the present optical lens system for taking image, the Abbe number of the first lens element is V1, the Abbe number of the second lens element is V2, and the Abbe number of the third lens element is V3, and they satisfy the relations:

V1=60.3

V2=23.4

V3=55.8

In the third embodiment of the present optical lens system for taking image, the refractive index of the first lens element is N1, the refractive index of the second lens element is N2, and they satisfy the relations:

N1=1.543

N2=1.632

In the third embodiment of the present optical lens system for taking image, the radius of curvature of the object-side surface of the first lens element is R1, and the radius of curvature of the image-side surface of the first lens element is R2. The radius of curvature of the object-side surface of the second lens element is R3, and the radius of curvature of the image-side surface of the second lens element is R4. The radius of curvature of the object-side surface of the third lens element is R5, and the radius of curvature of the image-side surface of the third lens element is R6. And they satisfy the relations:

$R1/R2=0.26$ $R3/R4=0.64$ $R5/R6=0.70$

In the third embodiment of the present optical lens system for taking image, the tangential angle at the position of the effective optical diameter of a image-side surface of the third lens element is ANG32, and ANG32=−33.1 deg.

The definition of the tangential angle of the third embodiment is the same as that of the first embodiment.

In the third embodiment of the present optical lens system for taking image, the radius of curvature of the image-side surface of the first lens element is R2, the radius of curvature of the object-side surface of the second lens element is R3, the focal length of the optical lens system for taking image is f, and they satisfy the relations:

R2=4.02870 mm

|R3|=0.72421 mm $R2/f=1.43$ $|R3/f|=0.26$

In the third embodiment of the present optical lens system for taking image, the center thickness of the second lens element is CT2, the distance between the second lens element and the third lens element is T23, and they satisfy the relations:

CT2=0.350 mm

T23=0.076 mm

In the third embodiment of the present optical lens system for taking image, the total optical length of the optical lens system is TL, the image height of the optical lens system is ImgH, and they satisfy the relation:

$TL/ImgH=2.00$

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f(focal length) = 2.82 mm, Fno = 2.85, HFOV (half of field of view) = 32.6 deg.

| Surface # | | Curvature Radius | Thickness | Material | Index | Abbe # | Focal length |
|---|---|---|---|---|---|---|---|
| 0 | Object | Plano | Infinity | | | | |
| A1 | Ape. Stop | Plano | −0.105 | | | | |
| 2 | Lens 1 | 1.03445(ASP) | 0.458 | Plastic | 1.543 | 60.3 | 2.42 |
| 3 | | 4.02870(ASP) | 0.604 | | | | |
| 4 | Lens 2 | −0.72421(ASP) | 0.350 | Plastic | 1.632 | 23.4 | −4.73 |
| 5 | | −1.13143(ASP) | 0.076 | | | | |
| 6 | Lens 3 | 1.45743(ASP) | 0.713 | Plastic | 1.530 | 55.8 | 6.55 |
| 7 | | 2.07671(ASP) | 0.200 | | | | |
| 8 | IR-filter | Plano | 0.300 | Glass | 1.517 | 64.2 | — |
| 9 | | Plano | 0.050 | | | | |
| 10 | Cover Glass | Plano | 0.550 | Glass | 1.517 | 64.2 | — |
| 11 | | Plano | 0.300 | | | | |
| 12 | Image | Plano | | | | | |

TABLE 6

Aspheric Coefficient

| Surface # | | | | | |
|---|---|---|---|---|---|
| 2 | 3 | 4 | 5 | 6 | 7 |
| K = −1.13214E+00 | −5.63165E+00 | −3.37290E+00 | −7.88187E+00 | −4.56225E+00 | −8.45760E−01 |
| A4 = 1.06524E−01 | 1.57231E−03 | −4.50823E−01 | −3.08663E−01 | −1.90478E−01 | −1.87228E−01 |
| A6 = 2.24142E−01 | −8.50913E−02 | 1.38093E+00 | 4.13291E−01 | 1.61210E−01 | 6.11410E−02 |
| A8 = −4.76374E−01 | −8.81876E−01 | −1.41666E+01 | −4.56740E−02 | −7.20296E−02 | −2.17200E−02 |
| A10 = — | — | 4.83921E+01 | — | 1.59441E−02 | 6.18511E−03 |
| A12 = — | — | −6.86424E+01 | — | −1.52149E−03 | −1.12243E−03 |

TABLE 7

| | Embodiment 1 | Embodiment 2 | Embodiment 3 |
|---|---|---|---|
| f | 2.84 | 2.90 | 2.82 |
| Fno | 2.85 | 2.85 | 2.85 |
| HFOV | 32.3 | 31.8 | 32.6 |
| V1 | 60.3 | 60.3 | 60.3 |
| V2 | 23.4 | 30.2 | 23.4 |
| V3 | 55.8 | 55.8 | 55.8 |
| N1 | 1.543 | 1.543 | 1.543 |
| N2 | 1.632 | 1.583 | 1.632 |
| f/f1 | 1.17 | 1.16 | 1.15 |
| |f/f2| | 0.67 | 0.73 | 0.59 |
| f/f3 | 0.49 | 0.52 | 0.43 |
| R1/R2 | 0.31 | 0.28 | 0.26 |
| R3/R4 | 0.62 | 0.58 | 0.64 |
| R5/R6 | 0.71 | 0.66 | 0.70 |
| R2 | 3.15940 | 3.73700 | 4.02870 |
| |R3| | 0.70263 | 0.74301 | 0.72421 |
| R2/f | 1.11 | 1.29 | 1.43 |
| |R3/f| | 0.25 | 0.26 | 0.26 |
| CT2 | 0.350 | 0.350 | 0.350 |
| T23 | 0.070 | 0.070 | 0.076 |
| ANG32 | −40.3 | −35.3 | −33.1 |
| TL/ImgH | 1.97 | 2.00 | 2.00 |

It is to be noted that the tables 1-6 show different data of the different embodiments, however, the data of the different embodiments is obtained from experiments. Therefore, any product of the same structure is contemplated to be within the scope of the present invention even if it uses different data. Table 7 is the data relevant to the present invention of the respective embodiments.

While we have shown and described various embodiments in accordance with the present invention, it should be clear to those skilled in the art that further embodiments may be made without departing from the scope of the present invention.

What is claimed is:

1. An optical lens system for taking image comprising three lens elements with refractive power, from the object side to the image side:
a first lens element with positive refractive power having a convex surface on the object side and a concave surface on the image side, at least one of the object-side surface and the image-side surface of the first lens element being aspheric;
a plastic second lens element with negative refractive power having a concave surface on the object side and a convex surface on the image side, the object-side surface and the image-side surface of the second lens element being aspheric;
a plastic third lens element with positive refractive power having a convex surface on the object side and a concave surface on the image side, the object-side surface and the image-side surface of the third lens element being aspheric; and
an aperture stop located in front of the first lens element for controlling brightness of the optical lens system;
wherein a focal length of the second lens element is f2, a focal length of the optical lens system is f, and they satisfy the relation:

$0.3 < |f/f2| < 0.74$.

2. The optical lens system for taking image as claimed in claim 1, wherein the first lens element is made of plastic material, the object-side surface and the image-side surface of the first lens element are aspheric, and the third lens element is formed with at least one inflection point.

3. The optical lens system for taking image as claimed in claim 1, wherein the focal length of the second lens element is f2, the focal length of the optical lens system is t and they satisfy the relation:

$|f/f2| < 0.6$.

4. The optical lens system for taking image as claimed in claim 1 wherein an Abbe number of the second lens element is V2, and it satisfies the relation:

$V2 < 40$.

5. The optical lens system for taking image as claimed in claim 4, wherein an Abbe number of the second lens element is V2, and it satisfies the relation:

$V2 < 28$.

6. The optical lens system for taking image as claimed in claim 5, wherein an Abbe number of the second lens element is V2, and it satisfies the relation:

$V2 < 25$.

7. The optical lens system for taking image as claimed in claim 2, wherein a refractive index of the first lens element is N1, an Abbe number of the first lens element is V1, a refractive index of the second lens element is N2, an Abbe number of the third lens element is V3, and they satisfy the relations:

$N1 < 1.6$ $V1 > 50$ $N2 < 1.7$ $V3 > 50$.

8. The optical lens system for taking image as claimed in claim 1, wherein a radius of curvature of the object-side surface of the first lens element is R1, and a radius of curvature of the image-side surface of the first lens element is R2, they satisfy the relation:

0.05<R1/R2<0.5.

9. The optical lens system for taking image as claimed in claim 8, wherein a radius of curvature of the object-side surface of the first lens element is R1, and a radius of curvature of the image-side surface of the first lens element is R2, they satisfy the relation:

0.25<R1/R2<0.45.

10. The optical lens system for taking image as claimed in claim 8, wherein a radius of curvature of the image-side surface of the first lens element is R2, a radius of curvature of the object-side surface of the second lens element is R3, and a radius of curvature of the image-side surface of the second lens element is R4, they satisfy the relations:

R2/f<2.0

|R3/f|<0.45

0.3<R3/R4<0.8.

11. The optical lens system for taking image as claimed in claim 10, wherein a radius of curvature of the object-side surface of the second lens element is R3, and a radius of curvature of the image-side surface of the second lens element is R4, a radius of curvature of the object-side surface of the third lens element is R5, and a radius of curvature of the image-side surface of the third lens element is R6, they satisfy the relations:

0.5<R3/R4<0.65

0.55<R5/R6<0.75.

12. The optical lens system for taking image as claimed in claim 2, wherein a focal length of the third lens element is f3, a focal length of the optical system is f, and they satisfy the relation:

f/f3>0.35.

13. The optical lens system for taking image as claimed in claim 5, wherein a center thickness of the second lens element is CT2, and it satisfies the relation:

0.25 mm<CT2<0.4 mm.

14. The optical lens system for taking image as claimed in claim 13, wherein a distance between the second lens element and the third lens element is T23, and it satisfies the relation:

T23<0.1 mm.

15. The optical lens system for taking image as claimed in claim 5, wherein the focal length of the first lens element is f1, the focal length of the optical lens system is f and they satisfy the relation:

f/f1>0.9.

16. The optical lens system for taking image as claimed in claim 15, wherein the focal length of the first lens element is f1, the focal length of the optical lens system is f, and they satisfy the relation:

1.1<f/f1<2.0.

17. The optical lens system for taking image as claimed in claim 8, wherein a radius of curvature of the image-side surface of the first lens element is R2, and a radius of curvature of the object-side surface of the second lens element is R3, they satisfy the relations:

R2<6 mm

|R3|<1.2 mm.

18. The optical lens system for taking image as claimed in claim 5, wherein an object to be photographed is imaged on an electronic sensor, a total optical length of the optical lens system is TL, an image height of the optical lens system is ImgH, and they satisfy the relation:

TL/ImgH<2.12.

19. The optical lens system for taking image as claimed in claim 8, wherein a tangential angle ANG32 at a position of an effective optical diameter of an image-side surface of the third lens element satisfies the relation:

ANG32<−32 deg.

20. An optical lens system for taking image comprising three lens elements with refractive power, from the object side to the image side:
a first lens element with positive refractive power having a convex surface on the object side and a concave surface on the image side, the object-side surface and the image-side surface of the first lens element being aspheric;
a plastic second lens element with negative refractive power having a concave surface on the object side and a convex surface on the image side, the object-side surface and the image-side surface of the second lens element being aspheric;
a plastic third lens element with positive refractive power having a convex surface on the object side and a concave surface on the image side, the object-side surface and the image-side surface of the third lens element being aspheric; and
an aperture stop located in front of the first lens element for controlling brightness of the optical lens system;
wherein a radius of curvature of the object-side surface of the first lens element is R1, and a radius of curvature of the image-side surface of the first lens element is R2, an Abbe number of the second lens element is V2, and they satisfy the relation:

0.05<R1/R2<0.5

V2<28 an object to be photographed is imaged on an electronic sensor, a total optical length of the optical lens system is TL, an image height of the optical lens system is ImgH, and they satisfy the relation:

TL/ImgH<2.12.

21. The optical lens system for taking image as claimed in claim 20, wherein a radius of curvature of the object-side surface of the first lens element is R1, and a radius of curvature of the image-side surface of the first lens element is R2, they satisfy the relation:

0.25<R1/R2<0.45.

* * * * *